(12) United States Patent
Chen et al.

(10) Patent No.: US 8,240,379 B2
(45) Date of Patent: Aug. 14, 2012

(54) SHEAR-ACTIVATED VISCOELASTIC SURFACTANT FLUID AND METHOD

(75) Inventors: Yiyan Chen, Sugar Land, TX (US); Oscar Bustos, Katy, TX (US); Philip F. Sullivan, Bellaire, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 391 days.

(21) Appl. No.: 12/607,750

(22) Filed: Oct. 28, 2009

(65) Prior Publication Data
US 2011/0094737 A1    Apr. 28, 2011

(51) Int. Cl.
*E21B 37/00* (2006.01)
*E21B 43/25* (2006.01)
*E21B 43/26* (2006.01)
*E21B 43/27* (2006.01)
*C09K 8/52* (2006.01)
*C09K 8/68* (2006.01)
*C09K 8/86* (2006.01)

(52) U.S. Cl. ..... 166/267; 166/282; 166/283; 166/305.1; 166/307; 166/308.2; 166/312; 507/219; 507/224; 507/230; 507/244; 507/259

(58) Field of Classification Search .......... None
See application file for complete search history.

(56) References Cited

U.S. PATENT DOCUMENTS

| | | | | |
|---|---|---|---|---|
| 4,806,256 | A * | 2/1989 | Rose et al. | 252/71 |
| 5,462,689 | A * | 10/1995 | Choy et al. | 510/373 |
| 5,728,665 | A * | 3/1998 | Choy et al. | 510/373 |
| 7,290,615 | B2 | 11/2007 | Christanti et al. | |
| 2005/0272630 | A1* | 12/2005 | Ajmani et al. | 510/499 |
| 2006/0063681 | A1* | 3/2006 | Christanti et al. | 507/203 |
| 2009/0111716 | A1* | 4/2009 | Hough et al. | 507/214 |
| 2010/0152068 | A1* | 6/2010 | Hartshorne et al. | 507/131 |

* cited by examiner

*Primary Examiner* — George Suchfield
(74) *Attorney, Agent, or Firm* — Michael Dae; Daryl Wright; Robin Nava

(57) ABSTRACT

A well treatment composition is formed from a fluid mixture of a viscoelastic surfactant and a liquid carrier fluid. The fluid mixture has rheological properties wherein the mixture exhibits shear-thickening behavior when the shear rate is increased from a first shear rate to a second higher shear rate. The fluid mixture may further include a shear activation additive that interacts with the viscoelastic surfactant to facilitate the shear-thickening behavior. The method is accomplished by introducing the fluid mixture into a wellbore formed in a subterranean formation. In certain applications, the fluid mixture may be recycled by bringing the fluid mixture to the surface and reintroducing the fluid into the same or a different wellbore.

33 Claims, 3 Drawing Sheets

Micelle         Lamella

SHEAR-ACTIVATED VISCOELASTIC SURFACTANT FLUID AND METHOD

BACKGROUND

The statements in this section merely provide background information related to the present disclosure and may not constitute prior art.

In the construction and development of wells formed in subterranean formations, such as wells for the production of oil and gas, various operations are carried out that require the introduction of fluids of different types into the wellbore and/or into formation surrounding the wellbore.

In certain applications it may be desired to pump or introduce a thin fluid and then rely on some trigger to make the fluid more viscous or viscoelastic to perform its intended function.

Viscoelastic surfactants (VES) have been used in fluids for many well treatment operations. Not to be limited by theory, but these viscoelastic surfactant systems under proper conditions form long rod-like or worm-like micelles in aqueous solution. Entanglement of these micelle structures gives viscosity and elasticity to the fluid. When these fluids are subjected to shear, the shear disrupts the micelle network so that the fluids exhibit shear-thinning behavior. When the shear is removed or lessened, the viscosity of the fluid recovers as the VES micelle network reassembles.

This shear-thinning behavior is beneficial in many well treatments. In hydraulic fracturing, for example, shear-thinning behavior is desired as the fracturing fluid is being pumped into the wellbore. Once the fracturing fluid enters the formation, however, increased viscosity is desired to facilitate suspension of proppant into the formed fractures. Thus, in these VES fluids the reduced shear results in an increase in viscosity of the fluid.

In coiled tubing cleanouts, it is desirable to introduce a thin fluid to minimize pumping power requirements, but then provide a thicker fluid once the fluid is jetted from the coiled tubing nozzle to suspend and transport particles back to the surface to facilitate cleanout. In this case, the VES fluid is thinned during the high shear imparted as the fluid is being pumped down the wellbore tubulars. Once jetted, the viscosity of the fluid recovers to facilitate cleanout.

U.S. Pat. No. 7,290,615 describes an example of a VES fluid that may be used for cleanout applications and that may be recycled for repeated use. In such applications, the pH of the fluid is cycled by utilizing pH adjusting agents to provide higher or thinner viscosity. Thus, when the VES fluid is introduced into the wellbore for cleanout, the fluid is provided with a high pH that provides a high viscosity for suspending particles cleaned from the well. When the cleanout fluid with the entrained particles is brought to the surface, the pH of the fluid is lowered so that the viscosity of the fluid is decreased to facilitate settling of the entrained particles. After the particles have settled, the fluid viscosity can then be increased again by readjusting the pH. The fluids may thus be used repeatedly by cycling the pH to different levels.

As can be seen, while the shear-thinning behavior of these VES fluids is beneficial, there may be applications where increases in viscosity of the VES fluid are necessary or beneficial in high shear environments or where an increase in shear may trigger an increase in viscosity without requiring chemical modification of the fluid. The present embodiments are directed to providing such fluids and methods.

SUMMARY

A well treatment method is carried out by providing a fluid mixture of a viscoelastic surfactant and a liquid carrier fluid. The fluid mixture has rheological properties wherein the mixture exhibits shear-thickening behavior when the shear rate is increased from a first shear rate to a second higher shear rate. In certain embodiments, the first shear rate is from about 10 $s^{-1}$ to about 100 $s^{-1}$. In the method, the fluid mixture is introduced into a wellbore formed in a subterranean formation.

In certain embodiments, the viscoelastic surfactant is present in the liquid carrier fluid in a state wherein the viscoelastic surfactant exhibits general phase separation within the carrier fluid when at static surface conditions. The fluid mixture may be introduced into a wellbore as at least one of wellbore cleanup fluid, a diverter fluid, a fracturing fluid and a fluid loss pill.

The fluid mixture may further comprise a rheology enhancer. The rheology enhancer may be selected from at least one of a polyvinyl ester, a polyvinyl acetate, a polyacrylate, a polyvinyl alcohol, an aromatic sulfonate, mutual solvents, ABA copolymers, and combinations thereof.

The viscoelastic surfactant may be selected from a zwitterionic surfactant, an amphoteric surfactant, an anionic surfactant, a cationic surfactant, and combinations thereof. The zwitterionic surfactant may comprise a surfactant or mixture of surfactants having the formula:

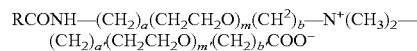
$$RCONH-(CH_2)_a(CH_2CH_2O)_m(CH^2)_b-N^+(CH_3)_2-(CH_2)_{a'}(CH_2CH_2O)_{m'}(CH_2)_{b'}COO^-$$

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

The fluid mixture may further comprise a shear activation additive that interacts with the viscoelastic surfactant to facilitate the shear-thickening behavior. In certain applications, the shear activation additive may be a delayed shear activation additive so that shear activation additive interacts with the viscoelastic surfactant subsequent to the fluid mixture being introduced into the wellbore. Where the viscoelastic surfactant is a zwitterionic surfactant, the shear activation additive may be a base.

In certain applications, the fluid mixture introduced into the wellbore is brought to the surface and reintroduced into the same or a different wellbore. In some cases, the fluid mixture introduced into the wellbore is allowed to entrain particles from the well within the fluid mixture. The fluid mixture is brought to the surface at a flow rate that facilitates the shear thickening behavior when brought to the surface while the particles are entrained therein. The fluid mixture is allowed to rest after being brought to the surface so that the viscosity of the fluid mixture falls below the viscosity exhibited during the shear thickening behavior so that the entrained particles settle within the fluid mixture. The fluid mixture may then be reintroduced into the same or a different wellbore after separating the settled particles from the fluid mixture.

In still another embodiment, a well treatment method is carried out by providing a fluid mixture of a zwitterionic viscoelastic surfactant, an aqueous liquid carrier fluid, a rheology enhancer and a shear activation additive. The fluid mixture has rheological properties wherein the mixture exhibits shear-thickening behavior when the shear rate is increased from a first shear rate to a second higher shear rate that is from about 10 $s^{-1}$ to about 1000 $s^{-1}$. In certain embodiments, the first shear rate may be from about 10 $s^{-1}$ to about 100 s⁻¹. The fluid mixture is introduced into a wellbore formed in a subterranean formation.

In certain embodiments, the viscoelastic surfactant is present in the liquid carrier fluid in a state wherein the viscoelastic surfactant exhibits general phase separation within the carrier fluid when at static surface conditions. The fluid mixture may be introduced into a wellbore as at least one of wellbore cleanup fluid, a diverter fluid, a fracturing fluid and a fluid loss pill.

The fluid mixture may further comprise a rheology enhancer. The rheology enhancer may be selected from at least one of a polyvinyl ester, a polyvinyl acetate, a polyacrylate, a polyvinyl alcohol, an aromatic sulfonate, mutual solvents, ABA copolymers, and combinations thereof.

The viscoelastic surfactant may be selected from a zwitterionic surfactant, an amphoteric surfactant, an anionic surfactant, a cationic surfactant, and combinations thereof. The zwitterionic surfactant may comprise a surfactant or mixture of surfactants having the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

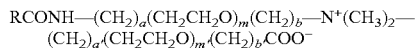

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

The fluid mixture may further comprise a shear activation additive that interacts with the viscoelastic surfactant to facilitate the shear-thickening behavior. In certain applications, the shear activation additive may be a delayed shear activation additive so that shear activation additive interacts with the viscoelastic surfactant subsequent to the fluid mixture being introduced into the wellbore. Where the viscoelastic surfactant is a zwitterionic surfactant, the shear activation additive may be a base.

In certain applications, the fluid mixture introduced into the wellbore is brought to the surface and reintroduced into the same or a different wellbore. In some cases, the fluid mixture introduced into the wellbore is allowed to entrain particles from the well within the fluid mixture. The fluid mixture is brought to the surface at a flow rate that facilitates the shear thickening behavior when brought to the surface while the particles are entrained therein. The fluid mixture is allowed to rest after being brought to the surface so that the viscosity of the fluid mixture falls below the viscosity exhibited during the shear thickening behavior so that the entrained particles settle within the fluid mixture. The fluid mixture may then be reintroduced into the same or a different wellbore after separating the settled particles from the fluid mixture.

A well treatment fluid is also provided in accordance with the embodiments. The well treatment fluid is a fluid mixture of a viscoelastic surfactant and a liquid carrier fluid. The fluid mixture has rheological properties wherein the mixture exhibits shear-thickening behavior when the shear rate is increased from a first shear rate to a second higher shear rate. In some embodiments, the first shear rate is from about 10 s⁻¹ to about 100 s⁻¹.

In certain embodiments, the viscoelastic surfactant is present in the liquid carrier fluid in a state wherein the viscoelastic surfactant exhibits general phase separation within the carrier fluid when at static surface conditions.

The fluid mixture may further comprise a rheology enhancer. The rheology enhancer may be selected from at least one of a polyvinyl ester, a polyvinyl acetate, a polyacrylate, a polyvinyl alcohol, an aromatic sulfonate, mutual solvents, ABA copolymers, and combinations thereof.

The viscoelastic surfactant may be selected from a zwitterionic surfactant, an amphoteric surfactant, an anionic surfactant, a cationic surfactant, and combinations thereof. The zwitterionic surfactant may comprise a surfactant or mixture of surfactants having the formula:

$$RCONH-(CH_2)_a(CH_2CH_2O)_m(CH^2)_b-N^+(CH_3)_2-(CH_2)_{a'}(CH_2CH_2O)_{m'}(CH_2)_{b'}COO^-$$

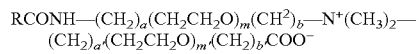

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

The fluid mixture may further comprise a shear activation additive that interacts with the viscoelastic surfactant to facilitate the shear-thickening behavior. In certain embodiments, the shear activation additive may be a delayed shear activation additive so that shear activation additive interacts with the viscoelastic surfactant subsequent to the fluid mixture being introduced into the wellbore. Where the viscoelastic surfactant is a zwitterionic surfactant, the shear activation additive may be a base.

BRIEF DESCRIPTION OF THE DRAWINGS

For a more complete understanding of the embodiments, reference is now made to the following descriptions taken in conjunction with the accompanying figures, in which.

DETAILED DESCRIPTION

Figure 1:
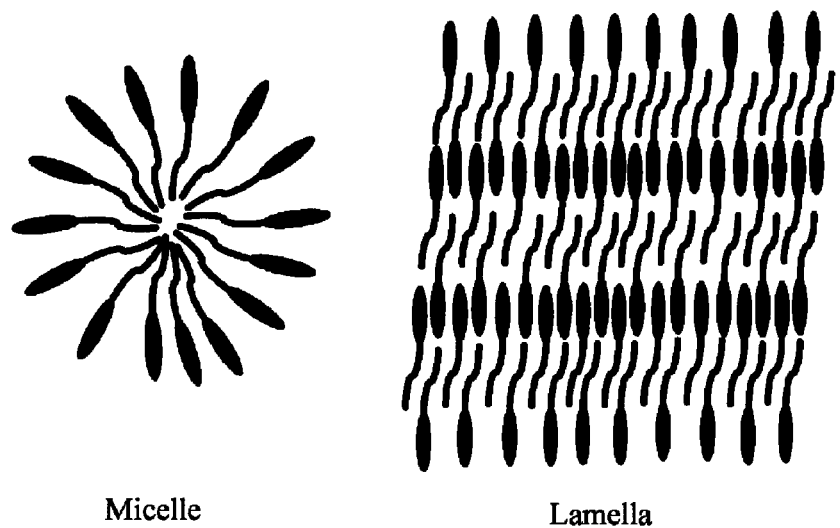
FIG. 1 is a representation of viscoelastic surfactant molecules arranged in a spherical micelle arrangement and a lamella arrangement.

The description and examples are presented solely for the purpose of illustrating the different embodiments and should not be construed as a limitation to the scope and applicability of the invention. While any compositions may be described herein as comprising certain materials, it should be understood that the composition could optionally comprise two or more chemically different materials. In addition, the compositions can also comprise some components other than the ones already cited. While the embodiments may be described in terms of treatment of vertical wells, it is equally applicable to wells of any orientation. The embodiments may be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

There may be certain applications in the treatment of wells where it may be desired to pump a thin fluid and then rely on a trigger to make the fluid into a viscous or viscoelastic fluid. The present embodiments are directed towards such fluids and methods of using such fluids.

Instead of behaving like traditional VES fluids, where the fluid is less viscous at higher shear, the present embodiments provide a fluid that has higher viscosity when shear is increased. These fluids deviate from the log-linear power-law behavior of traditional VES fluids by giving the same viscosity or a higher viscosity as the shear rate is increased. This may be accomplished by providing a VES fluid wherein the viscoelastic surfactant is present in a liquid carrier fluid in a state wherein the hydrophilic-lipophilic balance (HLB) of the viscoelastic surfactant is such that the VES is on the verge of forming worm-like micelles when the fluid is at static conditions. In certain instances, the VES may be in such a state that it exhibits phase separation from the carrier fluid when at static surface conditions. As used herein, the expression "static conditions" is meant to encompass a fluid that has been at rest or has not been subjected to shear for more than 30 minutes. As used herein, the expression "static surface conditions" is meant to encompass a fluid that has been at rest or not subjected to shear for more than 30 minutes at those conditions existing at the surface of the well with which the fluid is used. Such surface conditions may include an atmospheric pressure of approximately one atmosphere and a temperature of from about 5° C.-30° C., although the surface conditions for each particular well may vary for each well.

The viscoelastic surfactant may be a zwitterionic surfactant, a cationic surfactant, an amphoteric surfactant, an anionic surfactant, or combinations of these. Zwitterionic surfactants may be particularly useful. Suitable zwitterionic surfactants may have the structure of Formula (1) below:

RCONH—(CH$_2$)$_a$(CH$_2$CH$_2$O)$_m$(CH$_2$)$_b$—N$^+$(CH$_3$)$_2$—
(CH$_2$)$_{a'}$(CH$_2$CH$_2$O)$_{m'}$(CH$_2$)$_{b'}$COO$^-$     (1)

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and CH$_2$CH$_2$O may also be OCH$_2$CH$_2$.

Those zwitterionic surfactants that include betaines may be particularly useful. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc., Cranbury, N.J., U.S.A.) it is called Miraitane BET-O-30 because it contains an oleyl acid amide group (including a C$_{17}$H$_{33}$ alkene tail group) and contains about 30% active surfactant. The remainder is substantially water, sodium chloride, and propylene glycol. The surfactant in BET-O-30 is shown in Formula (2) below:

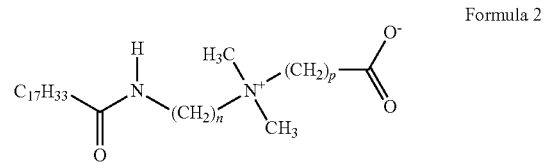

Surfactant in BET-O-30 (when n = 3 and p = 1)

An analogous material, BET-E-40, also available from Rhodia, Inc., contains an erucic acid amide group (including a C$_{21}$H$_{41}$ alkene tail group) and is approximately 40% active ingredient, with the remainder being substantially water, sodium chloride, and isopropanol. The surfactant in BET-E-40 is shown in Formula (3) below:

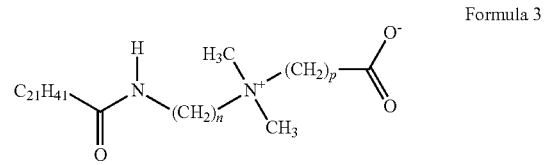

Surfactant in BET-E-40 (when n = 3 and p = 1)

One chemical name for this surfactant is erucylamidopropyl betaine. As-received concentrate of BET-E-40 was used in the experiments described later on. BET surfactants, and other VES's that may be suitable for the present embodiments, are described in U.S. Pat. No. 6,258,859, which is incorporated herein by reference. Mixtures of betaines, especially BET-E-40 with other surfactants, may also be suitable.

Cationic viscoelastic surfactants may also be used. The cationic surfactants may include the amine salts and quaternary amine salts disclosed in U.S. Pat. Nos. 5,979,557, and 6,435,277, which are each incorporated herein by reference. Examples of suitable cationic viscoelastic surfactants include cationic surfactants that may have the structure according to Formula (4) below:

R$_1$N$^+$(R$_2$)(R$_3$)(R$_4$)X$^-$     (4)

in which R$_1$ has from about 14 to about 26 carbon atoms and may be branched or straight chained, aromatic, saturated or unsaturated, and may contain a carbonyl, an amide, a retroamide, an imide, a urea, or an amine; R$_2$, R$_3$, and R$_4$ are each independently hydrogen or a C$_1$ to about C$_6$ aliphatic group which may be the same or different, branched or straight chained, saturated or unsaturated and one or more than one of which may be substituted with a group that renders the R$_2$, R$_3$, and R$_4$ group more hydrophilic; the R$_2$, R$_3$ and R$_4$ groups may be incorporated into a heterocyclic 5- or 6-member ring structure which includes the nitrogen atom; the R$_2$, R$_3$ and R$_4$ groups may be the same or different; R$_1$, R$_2$, R$_3$ and/or R$_4$ may contain one or more ethylene oxide and/or propylene oxide units; and X$^-$ is an anion. Mixtures of such compounds are also suitable. As a further example, R$_1$ is from about 18 to about 22 carbon atoms and may contain a carbonyl, an amide, or an amine, and R$_2$, R$_3$, and R$_4$ are the same as one another and contain from 1 to about 3 carbon atoms.

Cationic surfactants having the structure $R_1N^+(R_2)(R_3)(R_4)X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members.

Another example of a cationic VES is crucyl bis(2-hydroxyethyl)methyl ammonium chloride, also known as (Z)-13 docosenyl-N—N-bis(2-hydroxyethyl)methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl)ammonium chloride; erucylamidopropyltrimethylamine chloride, octadecyl methyl bis(hydroxyethyl) ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4,-dichlorobenzoate; cetyl tris(hydroxyethyl)ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris(hydroxyethyl) ammonium bromide; hexadecyl ethyl bis(hydroxyethyl)ammonium chloride; hexadecyl isopropyl bis(hydroxyethyl) ammonium iodide; and cetylamino, N-octadecyl pyridinium chloride.

Many fluids made with viscoelastic surfactant systems, for example those containing cationic surfactants having structures similar to that of erucyl bis(2-hydroxyethyl)methyl ammonium chloride, inherently have short re-heal times and rheology enhancers, as described later on, may not be needed except under special circumstances, for example at very low temperature.

Amphoteric viscoelastic surfactants may also be used. Amhpoteric viscoelastic surfactants can be modified to provide shear thickening behavior by making the VES less hydrophilic, such as keeping the pH high. Exemplary amphoteric viscoelastic surfactant systems include those described in U.S. Pat. No. 6,703,352, incorporated herein by reference, for example amine oxides. Other exemplary viscoelastic surfactant systems include those described in U.S. Pat. Nos. 7,060,661 and 7,303,018, each of which is incorporated herein by reference, for example amidoamine oxides.

Anionic viscoelastic surfactants may also be used. The anionic viscoelastic surfactant may have the general formula R—X, where R is a hydrophobic chain and X is a carboxyl (—COO—), sulfonyl (—OSO$_3$—) or sulfuric (—SO$_4$—) group. In some embodiments, the anionic surfactant may be an alkyl sarcosinate. The alkyl sarcosinate can generally have any number of carbon atoms. Certain alkyl sarcosinates have about 12 to about 24 carbon atoms. In some embodiments the alkyl sarcosinate may have about 14 to about 18 carbon atoms. Specific examples of the number of carbon atoms include 12, 14, 16, 18, 20, 22, and 24 carbon atoms. The alkyl sarcosinate anionic surfactant may be represented by the chemical Formula (5) below:

$$R_1CON(R_2)CH_2X \quad (5)$$

wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The amount of VES incorporated into the fluids may vary depending upon the use and the desired characteristics of the fluid. Generally, the VES may be incorporated into fluids used in embodiments in an amount ranging from about 0.2% to about 15% by weight of total weight of fluid. In certain embodiments, the VES may be present in an amount of from about 0.5% to about 12% by weight of total weight of fluid. In still other embodiments, the amount of VES may range from about 2% to about 10% by weight of total weight of fluid. The lower limit of VES should no less than about 0.2, 0.5, 0.7, 0.9, 1, 2, 3, 4, 5, 6, 7, 8, 9, 10, or 14 percent of total weight of fluid, and the upper limited being no more than about 15 percent of total fluid weight, specifically no greater than about 15, 14, 13, 12, 11, 10, 9, 8, 7, 6, 5, 1, 0.9, 0.7, 0.5 or 0.3 percent of total weight of fluid.

Rheology enhancers may be used with the viscoelastic surfactants. These may be used to shorten the shear recovery time, to increase the viscosity of the VES fluid and/or provide greater tolerance to brines. Such materials are typically called co-surfactants, rheology modifiers, rheology enhancers, etc. The expression "rheology enhancer," however, shall be used herein to refer to such materials. Various rheology enhancers may be used. The rheology enhancers are typically alcohols, organic acids, such as carboxylic acids and sulfonic acids, sulfonates, and others. In particular, such materials may include polyvinyl esters, polyvinyl acetates, polyacrylates, polyvinyl alcohols and aromatic sulfonates. Other non-limiting examples include those described in U.S. Pat. Nos. 7,402,549 and 7,507,693, each of which is incorporated by reference. U.S. Pat. No. 6,258,859 describes the use of sodium dodecylbenzene sulfonate (SDBS) as a rheology enhancer. Still other suitable rheology enhancers are certain chelating agents such as trisodium hydroxyethylethylenediamine triacetate.

Many amphiphilic materials may be used as rheology enhancers. These may include mutual solvents and ABA copolymers with A and B having an opposite affinity to water or oil. Such materials are described in U.S. Pat. Nos. 7,320,952; 7,341,980; 7,387,986 and 7,402,549, which are each incorporated herein by reference.

The amount and type of rheology enhancer may be dependent upon the VES surfactant fluid system at a given concentration and temperature. The appropriate amounts of surfactant and rheology enhancer are those necessary to achieve the desired stability and shear reheal time as may be determined by experiment. The rheology enhancer may be used in the fluid system in similar amounts to those described in the patents referenced above.

In certain instances, it may be necessary to include a shear activation additive. As used herein, the expression "shear activation additive" is meant to encompass those compounds or additives that are added to the fluid wherein such compounds or additives interact with the viscoelastic surfactant to facilitate the shear-thickening behavior, as is described herein. These may include acids, bases, salts, solvents, mutual solvents, etc. The type of shear activation additive used and amounts may vary depending upon the type of viscoelastic surfactant used and its structure. In certain embodiments, a combination of different viscoelastic surfactants that interact (e.g. cationic and anionic VES) to provide a similar effect. The shear activation additive may include those compounds that can facilitate the VES phase change from other non-worm-like-micelle structures to worm-like micelles. In certain embodiments, environmental conditions may facilitate shear activation behavior, such as temperature conditions.

To illustrate an example of how such shear activation additive may be used, it has been found that a zwitterionic surfactant with a permanently cationic quaternary amine in the middle part of the hydrophilic head and a carboxylic group on the front of the head can be tuned to provide shear thickening rheological properties by increasing the pH of the fluid. In such case, the shear activation additive is a base for increasing the pH of the fluid to provide the shear thickening properties. Not to be limited by theory, but it is believed that at very low pH, the carboxylic group is completely protonated, leaving the whole molecule acting like a normal cationic surfactant. At a pH between about 6 to 9, most of the carboxylic groups are deprotonated so that they exist as a carboxylate, wherein the molecule is slightly positively charged. At a very high pH (i.e. >10), however, the carboxylic groups are all deprotonated and the charge is fully developed so that the whole molecule forming the normally hydrophilic head is completely neutral. In the first two cases, the surfactants tend to arrange into worm-like micelles to minimize the hydrophobic tail exposure to water. At very high pH, however, when the fluid is first mixed, the surfactant can arrange into micelles, which may contain a certain amount of worm-like micelles and some spherical micelles and even vesicles, with the presence of worm-like micelles, the fluid acts as a viscoelastic fluid. When resting, however, the ionic interaction may be stronger to overcome the hydrophobic interactions, so that the surfactants can arrange into spherical micelles to minimize charge repulsions between adjacent layers of surfactant, or to arrange in a semi-crystalline lamella phase that has all the head groups paired with tails oriented in opposite directions, as illustrated in FIG. 1. In this phase, because there are no long range 3-D interactions, such as occurs with worm-like or rod-like micelles, the fluid does not have viscoelasticity.

It can therefore be seen, when such fluids are at rest or there is less shear applied to such fluids, the formation of either spherical micelles or the lamella structure, as in FIG. 1, may reduce the viscosity of the fluid. When a shear or a higher level of shear is applied, however, such spherical micelles or lamella structures may be disrupted so that the surfactant molecules may interact to form the worm-like micelles that contribute to viscoelasticity and impart higher viscosity to the fluid. Similar behaviors may be derived from other non-zwitterionic surfactants. The shear activation additive may be selected and used in amounts that provide similar behaviors. One indication of such behavior is the solubility of the viscoelastic surfactant in the carrier fluid. The shear activation additives may modify the viscoelastic surfactant fluid so that the viscoelastic surfactant is substantially insoluble within the carrier fluid or on the verge of insolubility as exhibited by phase separation of the viscoelastic surfactant from the aqueous carrier fluid when the fluid is at rest.

The shear activation additive may be a delayed shear activation additive. The delayed shear activation additive interacts with the viscoelastic surfactant subsequent to the fluid mixture being introduced into the wellbore. This facilitates maintaining the fluid at its normal viscoelastic state for longer periods, even when the fluid encounters high shear conditions that are above the shear activation shear conditions. The delayed shear activation additive may include those materials previously discussed that may be encapsulated so that their release is delayed or that may be derived in situ within the well after being introduced.

The shear activation additive may be encapsulated within various materials to facilitate delayed release. Some non-limiting examples of encapsulating materials that may degrade or decompose to release the shear activation additive may include acrylics, halocarbon, polyvinyl alcohol, Aquacoat® aqueous dispersions, hydrocarbon resins, polyvinyl chloride, Aquateric® enteric coatings, hydroxypropyl cellulose (HPC), polyvinylacetate phthalate, hydroxypropyl methyl cellulose (HPMC), polyvinylidene chloride, hydroxylpropyl methyl cellulose phthalate (HPMCP), proteins, Kynar®, fluoroplastics, rubber (natural or synthetic), caseinates, maltodextrins, shellac, chlorinated rubber, silicone, polyvinyl acetate phtalate (e.g. Coateric®) coatings, microcrystalline wax, starches, coating butters, milk solids, stearines, polyvinyl dichloride (Daran®) latex, molasses, sucrose, dextrins, nylon, surfactants, Opadry® combined polymer/plasticizer coating systems, Surelease® coating systems which are combination of film-forming polymer; plasticizer and stabilizers for sustained release, enterics, paraffin wax, Teflon® fluorocarbons, Eudragits® polymethacrylates, phenolics, waxes, ethoxylated vinyl alcohol, vinyl alcohol copolymer, polylactides, zein, fats, polyamino acids, fatty acids, polyethylene gelatin, polyethylene glycol, glycerides, polyvinyl acetate, vegetable gums and polyvinyl pyrrolidone.

In other embodiments, the shear activation additive is formed in situ. These may include slowly dissolving solid materials, which may include slowly dissolving acids, bases, salts, solvents, etc. One example of such a material is MgO that slowly dissolves in water to form the base $Mg(OH)_2$ to facilitate raising the pH of the fluid. Urea is another example of a material that will slowly dissolve in water to raise the pH of the fluid.

In situations where the shear activation additive is a pH lowering material, the delayed shear activation additive may be a solid polymer acid precursor that dissolves in the fluids to form monomeric acids that then facilitate shear activation. The pH lowering materials may be used, for example, with anionic viscoelastic surfactants. Such solid polymer acid precursors may include homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate, ethylenenaphthalate and combinations of these.

In certain applications, the shear-activation additives that are in solid form may serve a dual function, serving not only to facilitate shear activation, but also to act like particulate materials that serve other functions, such as as a bridging agent when the fluid is acting as a diverter fluid. The shear-activation additive solid particles may be use in combination with or as a mixture with other particulate materials. The solid shear-activation additives may be a variety of sizes, for example from about 8 mesh (2.38 mm) to about 170 mesh (0.088 mm). The solid shear activation additives may also be formed in a variety of shapes, such as rods, spheres, flakes, fibers, etc.

In use, the VES treatment fluid may be formulated at the surface. The viscoelastic surfactant, any rheology enhancer and/or shear activation additive, and any other additives, may be mixed with an aqueous fluid, such as fresh water, sea water, brine (e.g. KCl, NaCl, Ca, etc.), etc. Such materials may be mixed in a batch operation or on the fly. The treatment fluid is then introduced into the wellbore of the formation to facilitate treatment.

The shear-thickening VES fluid may exhibit a shear-thickening behavior when the shear rate is increased from one level to another. At or around the point at which the shear-thickening behavior is observed, the fluid may be activated or triggered to provide a higher viscosity, even when the shear is backed down to a lower shear rate. The amount of shear required to provide this activation or trigger and the extent of shear thickening behavior may vary. The shear-thickening characteristics may be designed for the particular treatment for which the treatment fluid is to be used and the shear typically encountered when performing the particular treatment. In certain applications, the fluids may exhibit shear-thickening behavior when the shear rate is at about $10\ s^{-1}$ or more. Thus, the fluids may undergo shear-thickening behavior when the shear rate is increased from a first shear rate in the range of about $1\ s^{-1}$ to about $1000\ s^{-1}$ or more to another higher shear rate. In certain applications, the shear-thickening behavior may be exhibited when the shear is initially from about $10\ s^{-1}$ or less to about $100\ s^{-1}$ so that at higher shear rates (i.e. greater than $100\ s^{-1}$) the shear-thickening behavior is observed. In other applications, the shear-thickening behavior may be observed when the shear is increased from about $1\ s^{-1}$ or less, with shear-thickening behavior occurring when the shear rate is increased to $10\ s^{-1}$ or more. In some cases, the shear-thickening behavior may be triggered more rapidly at higher shear rates, while lower shear rates may still trigger the shear-thickening behavior but require longer shear times.

The degree of shear thickening behavior for each fluid may vary. In certain applications, once the fluid is subjected to the shear rate that triggers shear-thickening behavior, the viscosity of the fluid may be increased by as much as about 10%, 100%, 1000% or even 2000%. The elevated viscosity may be maintained until the fluid is allowed to rest, where the fluid viscosity returns to the pre-shear-thickening viscosity for any given shear rate. Resting of the fluid may be defined as subjecting the fluid to shear of about $1\ s^{-1}$ or less. This return or recycling of the fluid to its initial state may occur without any chemical modification of the fluid wherein further additives are added to the fluid to return the fluid to its pre-shear-thickened state.

The fluids have application to various well treatments. Non-limiting examples may include use as a wellbore cleanup fluid, a diverter fluid, a fracturing fluid or a fluid loss pill. The fluids may have application to other treatments as well.

The fluids have particular application for use as wellbore cleanup fluids. As used herein, the expression "wellbore" is meant to encompass open or cased holes or production tubing at any time between drilling and abandonment. Such wellbores may be vertical, deviated, or horizontal. The wellbore cleanout may be carried out to remove various particles or materials. Particles, such as beads, may be used in jetting operations in wellbores and afterward it may be desirable to remove this material. Produced "sand" (including proppant and/or gravel and/or particles such as silt and clay from the formation) accumulating in the production tubing during fluid flow to the wellbore can greatly restrict hydrocarbon production. Other undesired particulates such as cuttings, cement pieces, fibers, other proppant flowback control agents, fluid loss additives, and debris, including debris formed by perforating, may be present at some stage in the life of a well. In horizontal or deviated wells, undesired fluids, that may or may not contain solid particles, may accumulate in low spots.

Coiled tubing has been widely used as a means to clean out materials from a wellbore. It is typically desirable for fluids used for coiled tubing cleanout to have low friction pressure to minimize hydraulic horsepower requirements and sufficient viscosity for good material carrying and/or displacing capability to aid in carrying and/or displacing the material to the surface for disposal. Normally, light fluids are preferred to reduce the possibility of fracturing and to minimize the hydraulic horsepower needed to return the fluid to the surface.

Normally in coiled tubing cleanout operations, the cleanout fluid is pumped down the coiled tubing, out through a specialized nozzle or nozzles at the end of the coiled tubing and into the wellbore, and then up through the annulus between the coiled tubing and the wellbore. The cleanout fluid fluidizes the particulate material and entrains it and carries it to the surface. In a "reverse cleanout" operation, the fluid is circulated down through the annulus and up through the coiled tubing and no nozzles are used. In either case, the process may be carried out pressure-balanced to minimize fluid loss to the formation. In prior art methods, when the fluid containing entrained particulates reaches the surface, the particulates may be removed by a device such as a sieve-shaker (shale shaker) or a centrifuge (hydrocyclone). Simply waiting for the particles to separate out is not normally a suitable commercial option because it takes too long in the viscous fluid needed to carry the particles to the surface. This is not necessary when using the shear-thickening fluids.

In use as a wellbore cleanup, when pumping the fluid downhole through coiled tubing, the fluid is initially in its pre-shear-thickened state so that it is thin to reduce drag and minimize pumping horsepower. When the fluid is jetted from the nozzle of the coil tubing, the shear experienced during jetting through the nozzle activates or triggers the shear-thickening behavior so that it is viscous or viscoelastic to facilitate transport of particles back through the wellbore up to the surface. At the surface, when shear is removed from the fluid, it becomes thin again to allow the particles to drop out of or be separated from the fluid. The fluid can then be reused or recycled again into the same or a different wellbore to facilitate further cleanup operations.

A suitable higher viscosity of the shear-thickened fluid is the viscosity necessary to fluidize the particles present downhole and entrain them and carry them to the surface. This depends among other factors upon the relative densities of the particles and the fluid, and on the flow rates at the nozzle and in the annulus. A suitable lower viscosity is a viscosity at which the particles settle from the fluid at the surface in a time short enough so that additional mechanical devices such as sieve shakers and centrifuges are not needed. This depends among other factors upon the relative densities of the particles and the fluid, the residence time of the fluid in the settling tank, which may be dependent on the flow rate and tank capacity, and the time and the removal effectiveness the operator considers satisfactory. In general a viscosity of at least about 50 mPa·s, for example at least about 100 mPa·s, is suitable for fluidizing and entraining particles in a cleanout operation. As presented herein, all viscosities are given at a shear rate of 100 sec$^{-1}$. An upper limit might be based on minimizing unnecessary expenditure of hydraulic horsepower in pumping. In general a viscosity of less than about 50 mPa·s, for example less than about 20 mPa·s, may be suitable for particle settling and for initial pumping into the well.

In wellbore cleanouts, solid additives are normally not included in the cleanout fluids because they are removed when the particles are taken out of the fluid at the surface. If necessary, however, fluid loss additives may be included as may fibers that improve the ability of a fluid to entrain other particles. These may be selected to be of such low density that they are not removed in the settling stage, or they may be removed and then fresh portions added in subsequent stages. Fibers may not pass through the coiled tubing nozzles but may be used in reverse cleanouts. The components of the cleanout fluid may be batch-mixed or mixed on the fly. If batch mixing is used, any combination of components may be premixed in a concentrate or slurry for delivery to the job site.

The fluids may also be used as diverter fluids. In hydraulic fracturing, for instance, when the pressure reaches a certain threshold, micro-fractures in the formation may open creating flow paths where there is a large amount of fluid loss. These lost fluids can damage the formation. The sudden high fluid loss can also cause the proppant to bridge during fracturing treatment, which can lead to screen-out. As the fluid leaks off into these fractures, it is suddenly high sheared. As can be seen, if the shear-thickening shear trigger of the fluids is reached due to this high shear, the higher viscosity or viscoelasticity may facilitate temporarily sealing or reducing fluid leak off to these fractures. The main fracture can then continue to propagate in its main direction.

Once the fracture treatment is complete, or the shearing is removed, the fluid relaxes to its pre-triggered viscosity to facilitate flowback. The viscoelastic surfactant fluid provides a solid-free environment so that it ensures the formation is not damaged. In certain applications, the use of the VES fluids as a diverter can facilitate diverting a treatment from one set of perforations or zones to another when needed. Various solid materials, which may be degradable or non-degradable, such as proppant, fibers, dissolvable fluid loss additives, etc., may also be used in the treatment fluids.

For matrix acidizing treatments, fluids are injected into the subterranean formation at pressures below fracturing pressures. It is common in many cases to use coiled tubing to carry out the stimulation treatment. In such cases the shear-thickening fluid can be pumped down the coiled tubing at any given time where there is a need to divert fluids away from zones that are already stimulated. A common job sequence for such a stimulation treatment consists of alternating a stimulation fluid with a diverter, stimulation fluid. These are normally acid-based fluids (e.g. hydrochloric, formic, acetic etc) or can be non-acid based fluid like chelants. The objective of having reacting fluids treating the critical matrix of the reservoir is to bypass or eliminate the formation damage induced during the drilling and completion of the well. Diverters are commonly used for those applications to ensure the stimulation fluid is distributed as homogeneous as possible across the different sections of the reservoir. The shear-thickening fluids used in such cases are pumped downhole as a diverter, whereby the shear-activated fluid will experience an increase of viscosity after passing through a downhole coiled tubing nozzle. Once the fluid is shear activated and distributed across the zones being treated to facilitate diversion, the fluid with increased viscosity will exhibit more resistance to injection and will force the subsequent fluid introduced into an unstimulated zone. One desirable characteristic of particulate or chemical diverters is that they leave no residue or damage behind. In the present case, by using VES fluids no damage is left behind.

Also when using the shear-activated fluid as a diverter, it is possible to use other degradable particulates to enhance the bridging capability of the diverter fluid, especially when treating formations having a large contrast of permeability or that are naturally fractured. Such particulates may be of different sizes and shapes, such as spheres, flakes, rods, fibers, etc. A mixture of different degradable particulates could also be used depending on the permeability contrast of the formation. The shear-activation additives may also be used as the particulate or in combination with other particulates, as previously discussed.

The shear-thickening fluids may also be used for acid fracturing applications. In such applications, it is common to alternate reactive fluids (acids, chelants etc) with non-reactive fluids (VES-fluids, polymer-based fluids) during the acid fracturing operations. In such treatments, the fluids are injected at pressure above fracturing pressures in carbonate (e.g. limestone and dolomite) formations. One desirable characteristic of the fluids used in acid fracturing is to have a large viscosity contrast. The contrasts in viscosity of the injected fluids causes the fluids to generate viscous fingering, whereby the reactive fluid (normally having low viscosity) will preferentially channel or finger thru the fluid with higher viscosity. Such preferential flow extends the fingering inside the hydraulic fracture and may facilitate differential etching. Such differential etching is directly proportional to the conductivity (fracture permeability time fracture's width) generated by the acid fracturing. Shear activated fluids may promote the fingering effects by providing a more viscous fluids after they are exposed to the shear at the perforations. Likewise in acid fracturing, the fluids may be polymer- and solids free.

In another application, the shear-thickening VES fluid is used in a manner similar to "slick-water" fracturing, where low viscosity fluids, typically water, are commonly used. In such fracturing operations, the low viscosity fluid, which may be combined with a friction reducing agent, is pumped with low viscosity and low friction pressure through the tubing. Typically, polyacrylamides are used as the friction-reducing agent. Once the fluid passes the perforations, shear activates the fluid to increase the viscosity or cause it to become viscoelastic. The thicker fluid facilitates carrying the proppant deeper into the formation.

In such treatments, lighter weight and significantly lower amounts of proppant than conventional viscosified fracturing fluids may be used. The proppant used may have a smaller particle size than those used from conventional fracturing treatments used in oil-bearing formations. Where it is used, the proppant may have a size, amount and density so that it is efficiently carried, dispersed and positioned by the treatment fluid within the formed fractures. Proppants may include sand, bauxite, ceramic and other materials. Such fracturing fluids may be particularly useful in low-permeable, gas-bearing formations, such as tight-gas shale and sand formations, where fracture width is of less concern. Such formations may have a permeability of from about 1 mD or 0.5 mD or less. The treatment fluid is introduced into the formation above the fracture pressure of the formation. The friction-reducing agent may be a polyacrylamide, which are typically used in slick-water fracturing fluids.

The shear-thickening fluids may also be used as a fluid loss pill for use in high leak off zones of the formation. They may be used where high density brines are being lost to the formation. In conventional fluid loss pills, a crosslinked polymer fluid may be used, which may be difficult to clean up and may damage the formation. In the present invention, the fluid is a shear-thickening fluid that is in its initially low viscosity state prior to shear activation. The thickness of the fluid is increased by the increased shear due to the leak off into the formation. When the fluid relaxes, the viscosity lowers, which allows the fluid to flow back from the high permeability zone. The shear-thickening VES fluids used as a fluid loss pill may further comprise bridging particulates, usually graded sodium or potassium salts, sized calcium carbonate particulates, or even degradable particulates like graded polylactide acid particles or fibers.

The shear-thickening fluids described herein may be used for other applications, as well. Although the uses have been described in terms of producing wells for oil and/or gas, the fluids and methods may also be used for injection wells (such as for enhanced recovery or for storage) or for production wells for other fluids such as carbon dioxide or water.

The following examples serve to further illustrate the embodiments.

EXAMPLES

Example 1

Sample 1: To form Sample 1, an aqueous VES fluid was formulated using fresh water and the zwitterionic viscoelastic surfactant BET-E-40, available from Rhodia, Inc., which was approximately 40% as active VES, with the remainder being substantially water, sodium chloride, and isopropanol. The BET-E-40 was used in an amount of about 1.5% by weight of the fluid. A polyvinyl alcohol rheology enhancer (Alcotex WD100, available from Synthomer Inc., at 43% hydrolyzed PVA), was used in an amount of about 0.004% by weight of the fluid. Sodium hydroxide was used as the shear activation additive at approximately 8% by weight of the fluid to provide a fluid pH of about 12 to 13.

Sample 2: Sample 2 was prepared similarly to Sample 1, but contained 4.5% by weight BET-E-40 and the WD100 rheology enhancer was used in an amount of about 0.012% by weight of the fluid. Sodium hydroxide was used as the shear activation additive at approximately 8% by weight of the fluid to provide a fluid pH of about 12 to 13.

Each of the fluid Samples 1 and 2 were blended in a Waring blender and allowed to sit for no less than 20 minutes. The fluids were thin with no elasticity and low viscosity. The mixtures were each loaded into a Bohlin rheometer with a cup and vein tool geometry. The vein tool was used to mimic mixing that was not simply laminar shear. The rheometer was started in the viscometry mode from low shear rate to high, and then down to low shear rate again to provide a shear sweep curve. The results are presented in FIGS. 2 and 3.

Figure 2:
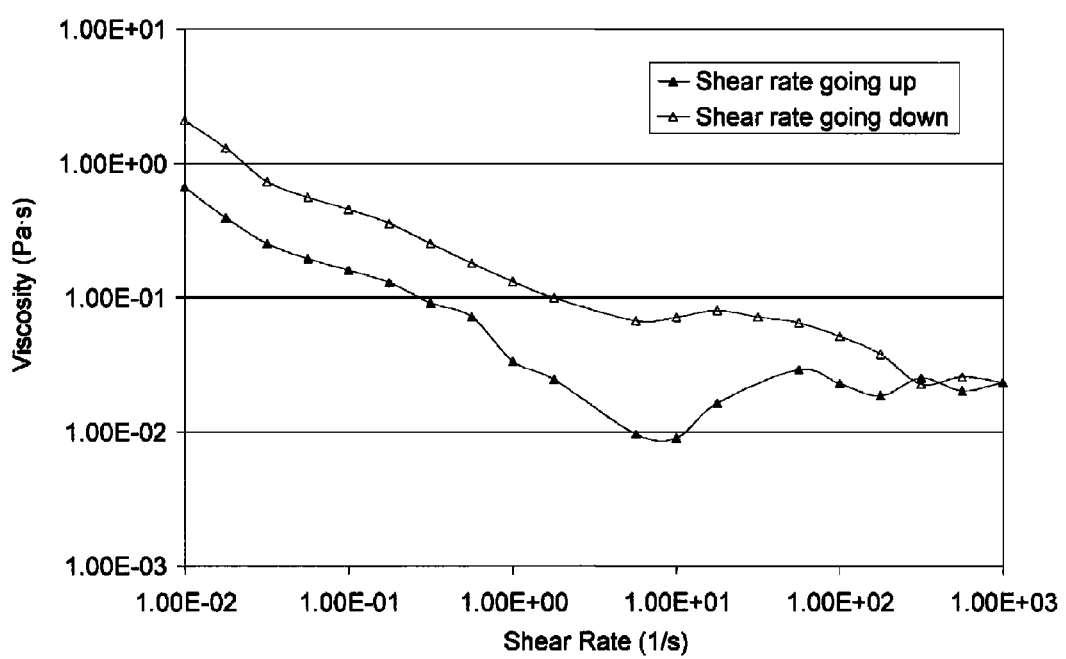
FIG. 2 is a shear sweep plot of viscosity versus shear rate for fluid Sample 1 from Example 1.
Figure 3:
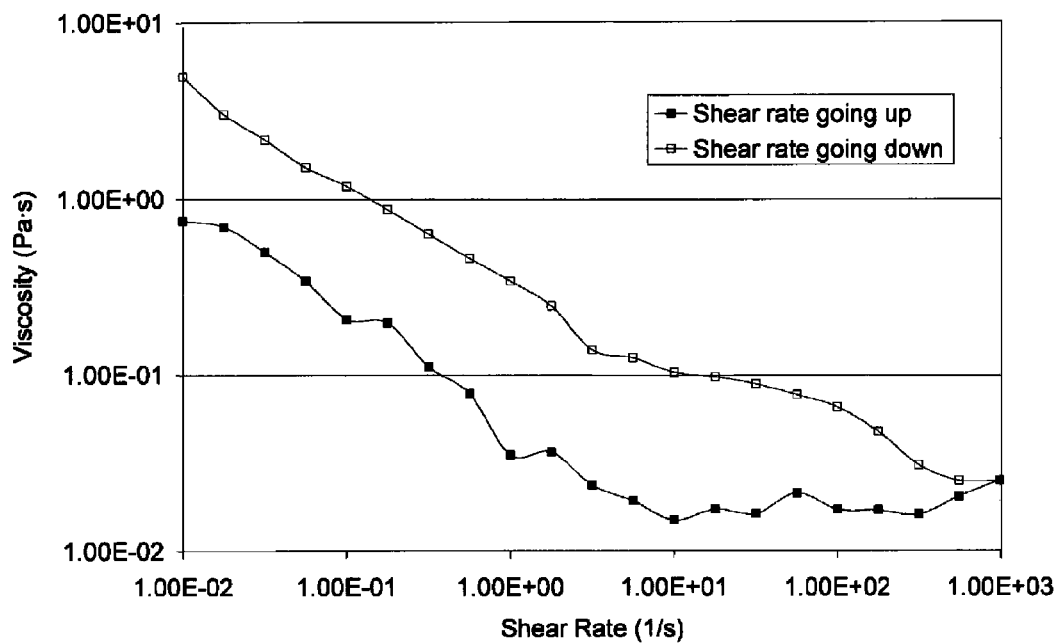
FIG. 3 is a shear sweep plot of viscosity versus shear rate for fluid Sample 2 from Example 1.

As can be seen from FIGS. 2 and 3, when the shear rate was around 10 s$^{-1}$, the fluids deviated from the power law shear thinning behavior typically observed for traditional VES fluids and started to increase in viscosity. This was an indication that shear thickening was occurring and the fluid was shear activated in its basic condition. The shear rate ramping down curves of each fluid shows consistently higher viscosity than their viscosity during the shear rate ramping up at equivalent shear rates. This also indicates that the high shear in the shear rate ramp up had already activated the fluid to a higher viscosity or improved viscoelasticity than during the fluid shear ramp up.

Visual observations of each of fluid Samples 1 and 2 confirmed qualitatively the properties of the shear-thickening fluids. When either of the fluids was sheared at high shear rates for a short time (less than 1 minute) or at lower shear rates for longer periods (no less than 5 minutes), they became viscoelastic, as evidenced by the formation of a lip when the fluids were poured from one container to another. Upon sitting statically in the blender cup, the fluids gradually lost their lipping ability and eventually became thin, pouring like water. For Sample 2, which contained 4.5% of the VES, after sitting for greater than two hours, there was phase separation observed with a top surfactant rich layer resting on a thin bottom water layer. Sample 1 did not exhibit phase separation even after resting overnight.

Example 2

Two fully relaxed loadings of Sample 1 from Example 1 were each loaded in the Bohlin rheometer with the geometry previously described for Example 1. The rheometer was started at room temperature in viscometry mode at shear rates of 10 s$^{-1}$ and 1000 s$^{-1}$. The shear rates were applied for four minutes for each loading. Viscosities were recorded as the fluid was being sheared. The results are presented in FIG. 4.

Figure 4:
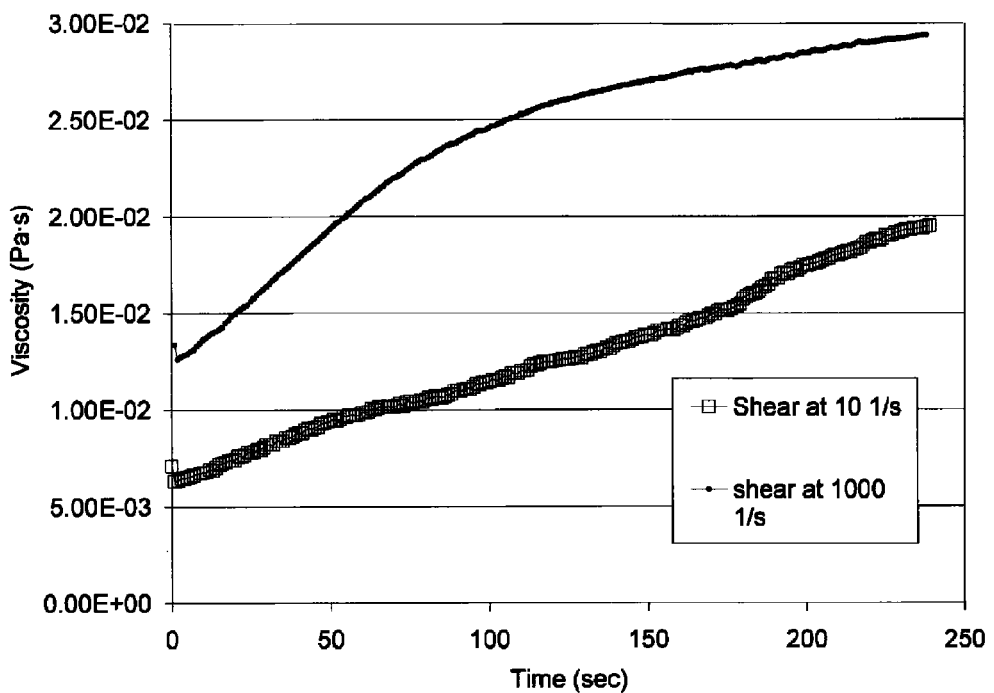
FIG. 4 is a plot of viscosity over time for fluid Sample 1 from Example 2 in a shear-thickened state at shear rates of 10 s⁻¹ and 1000 s⁻¹.

As can be seen from FIG. 4, the fluid viscosities increased at both shear rates, indicating that shear thickening or gelling had occurred. The fluid viscosity at the higher shear rate at 1000 s$^{-1}$ was higher than the viscosity at 10 s$^{-1}$, indicating that the fluid is a shear thickening fluid. Also, when the fluid was sheared at 1000 s$^{-1}$, it was activated more rapidly than when a shear of 10 s$^{-1}$ was applied. This was likely the result of the shear energy input to the fluid.

Example 3

Figure 5:
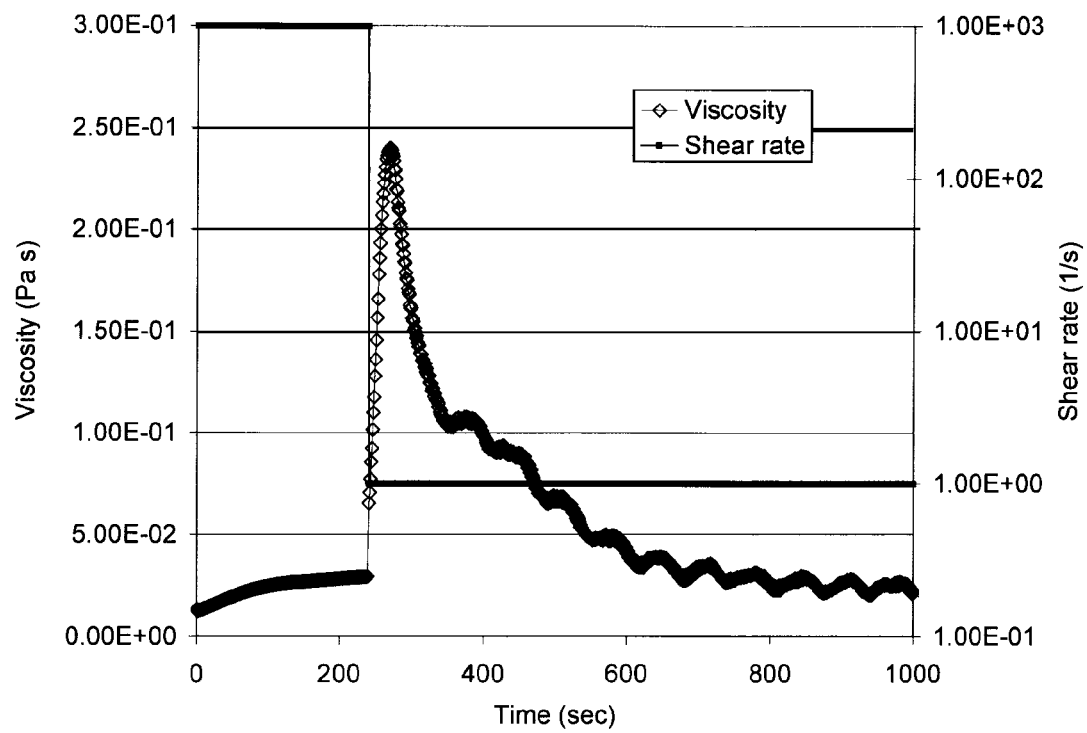
FIG. 5 is a plot of viscosity over time of fluid Sample 1 sheared at 1000 s⁻¹ from Example 3, wherein the fluid is allowed to relax at a shear rate of 1 s⁻¹.

After the fluid sample sheared at 1000 s$^{-1}$ from Example 2 was sheared for a few minutes, it was allowed to relax at a low shear rate of 1 s$^{-1}$. This was done to record the viscosity change profile. The results are presented in FIG. 5. The viscosity started at a high value of about 0.24 Pa·s after high shear. The viscosity then gradually dropped down to 0.026 Pa·s, which is an order of magnitude decrease. This is evidence that the shear-activated fluid was breaking with time.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:
1. A method comprising:
providing a fluid mixture of a viscoelastic surfactant and a liquid carrier fluid, the fluid mixture having rheological properties wherein the mixture exhibits shear-thickening behavior when the shear rate is increased from a first shear rate to a second higher shear rate; and
introducing the fluid mixture into a wellbore formed in a subterranean formation,
wherein the fluid mixture further comprises a shear activation additive that interacts with the viscoelastic surfactant to facilitate the shear-thickening behavior and the shear activation additive is a delayed shear activation additive so that shear activation additive interacts with the viscoelastic surfactant subsequent to the fluid mixture being introduced into the wellbore.

2. The method of claim 1, wherein:
the viscoelastic surfactant is present in the liquid carrier fluid in a state wherein the viscoelastic surfactant exhibits general phase separation within the carrier fluid when at static surface conditions.

3. The method of claim 1, wherein:
the fluid mixture is introduced into a wellbore as at least one of wellbore cleanup fluid, a diverter fluid, a fracturing fluid and a fluid loss pill.

4. The method of claim 1, wherein:
the first shear rate is from about 10 s$^{-1}$ to about 100 s$^{-1}$.

5. The method of claim 1, wherein:
the fluid mixture further comprises a rheology enhancer.

6. The method of claim 5, wherein:
the rheology enhancer is selected from at least one of a polyvinyl ester, a polyvinyl acetate, a polyacrylate, a polyvinyl alcohol, an aromatic sulfonate, mutual solvents, ABA copolymers, and combinations thereof.

7. The method of claim 1, wherein:
the viscoelastic surfactant is selected from a zwitterionic surfactant, an amphoteric surfactant, an anionic surfactant, a cationic surfactant, and combinations thereof.

8. The method of claim 1, wherein:
the viscoelastic surfactant is a zwitterionic surfactant.

9. The method of claim 8, wherein:
the zwitterionic surfactant comprises a surfactant or mixture of surfactants having the formula:

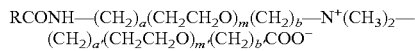

RCONH—(CH$_2$)$_a$(CH$_2$CH$_2$O)$_m$(CH$_2$)$_b$—N$^+$(CH$_3$)$_2$—(CH$_2$)$_{a'}$(CH$_2$CH$_2$O)$_{m'}$(CH$_2$)$_{b'}$COO$^-$ wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and CH$_2$CH$_2$O may also be OCH$_2$CH$_2$.

10. The method of claim 1, wherein:
the viscoelastic surfactant is a zwitterionic surfactant and wherein the shear activation additive is a base.

11. The method of claim 1, further comprising:
bringing the fluid mixture introduced into the wellbore to the surface; and
reintroducing the fluid mixture into the same or a different wellbore.

12. A method comprising:
providing a fluid mixture of a viscoelastic surfactant and a liquid carrier fluid, the fluid mixture having rheological properties wherein the mixture exhibits shear-thickening behavior when the shear rate is increased from a first shear rate to a second higher shear rate; and
introducing the fluid mixture into a wellbore formed in a subterranean formation, wherein the fluid mixture introduced into the wellbore is allowed to entrain particles from the well within the fluid mixture, the fluid mixture being brought to the surface at a flow rate that facilitates the shear thickening behavior when brought to the surface while the particles are entrained therein; and
allowing the fluid mixture to rest after being brought to the surface so that the viscosity of the fluid mixture falls below the viscosity exhibited during the shear thickening behavior so that the entrained particles settle within the fluid mixture; and
reintroducing the fluid mixture into the same or a different wellbore after separating the settled particles from the fluid mixture.

13. A well treatment method comprising:
providing a fluid mixture of a viscoelastic surfactant, an aqueous liquid carrier fluid, a rheology enhancer and a shear activation additive, the fluid mixture having rheological properties wherein the mixture exhibits shear-thickening behavior when the shear rate is increased from a first shear rate to a second higher shear rate that is from about 10 s$^{-1}$ to about 1000 s$^{-1}$; and
introducing the fluid mixture into a wellbore formed in a subterranean formation, wherein the fluid mixture introduced into the wellbore is allowed to entrain particles from the well within the fluid mixture, the fluid mixture being brought to the surface at a flow rate that facilitates the shear thickening behavior when brought to the surface while the particles are entrained therein; and
allowing the fluid mixture to rest after being brought to the surface so that the viscosity of the fluid mixture falls below the viscosity exhibited during the shear thickening behavior so that the entrained particles settle within the fluid mixture; and
reintroducing the fluid mixture into the same or a different wellbore after separating the settled particles from the fluid mixture.

14. The method of claim 13, wherein:
the viscoelastic surfactant is present in the liquid carrier fluid in a state wherein the viscoelastic surfactant exhibits general phase separation within the carrier fluid when at static surface conditions.

15. The method of claim 13, wherein:
the first shear rate is from about 10 s$^{-1}$ to about 100 s$^{-1}$.

16. The method of claim 13, wherein:
the rheology enhancer is selected from at least one of a polyvinyl ester, a polyvinyl acetate, a polyacrylate, a polyvinyl alcohol, an aromatic sulfonate, mutual solvents, ABA copolymers, and combinations thereof.

17. The method of claim 13, wherein:
the viscoelastic surfactant is selected from a zwitterionic surfactant, an amphoteric surfactant, an anionic surfactant, a cationic surfactant, and combinations thereof.

18. The method of claim 13, wherein:
the viscoelastic surfactant is a zwitterionic surfactant.

19. The method of claim 13, wherein:
the zwitterionic surfactant comprises a surfactant or mixture of surfactants having the formula:

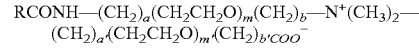

RCONH—(CH$_2$)$_a$(CH$_2$CH$_2$O)$_m$(CH$_2$)$_b$—N$^+$(CH$_3$)$_2$—(CH$_2$)$_{a'}$(CH$_2$CH$_2$O)$_{m'}$(CH$_2$)$_{b'}$COO$^-$ wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and CH$_2$CH$_2$O may also be OCH$_2$CH$_2$.

20. The method of claim 13, wherein:
the mixture further comprises a shear activation additive that interacts with the viscoelastic surfactant to facilitate the shear-thickening behavior.

21. The method of claim 13, wherein:
the viscoelastic surfactant is a zwitterionic surfactant and wherein the shear activation additive is a base.

22. The method of claim 13, wherein:
the fluid mixture is introduced into a wellbore as at least one of wellbore cleanup fluid, a diverter fluid, a fracturing fluid and a fluid loss pill.

23. The method of claim 13, further comprising:
bringing the fluid mixture introduced into the wellbore to the surface; and
reintroducing the fluid mixture into the same or a different wellbore.

24. A well treatment method comprising:
providing a fluid mixture of a zwitterionic viscoelastic surfactant, an aqueous liquid carrier fluid, a rheology enhancer and a shear activation additive, the fluid mixture having rheological properties wherein the mixture exhibits shear-thickening behavior when the shear rate is increased from a first shear rate to a second higher shear rate that is from about 10 s−1 to about 1000 s−1; and
introducing the fluid mixture into a wellbore formed in a subterranean formation,
wherein the mixture further comprises a shear activation additive that interacts with the viscoelastic surfactant to facilitate the shear-thickening behavior and the shear activation additive is a delayed shear activation additive so that shear activation additive interacts with the viscoelastic surfactant subsequent to the fluid mixture being introduced into the wellbore.

25. A well treatment fluid comprising:
a fluid mixture of a viscoelastic surfactant and a liquid carrier fluid, the fluid mixture having rheological properties wherein the mixture exhibits shear-thickening behavior when the shear rate is increased from a first shear rate to a second higher shear rate, wherein the well treatment fluid further comprising a shear activation additive that interacts with the viscoelastic surfactant to facilitate the shear-thickening behavior and the shear activation additive is a delayed shear activation additive so that shear activation additive interacts with the viscoelastic surfactant subsequent to the fluid mixture being introduced into the wellbore.

26. The well treatment fluid of claim 25, wherein:
the viscoelastic surfactant is present in the liquid carrier fluid in a state wherein the viscoelastic surfactant exhibits general phase separation within the carrier fluid.

27. The well treatment fluid of claim 25, wherein:
the first shear rate is from about 10 s$^{-1}$ to about 100 s$^{-1}$.

28. The well treatment fluid of claim 25, further comprising:
a rheology enhancer.

29. The well treatment fluid of claim 28, wherein:
the rheology enhancer is selected from at least one of a polyvinyl ester, a polyvinyl acetate, a polyacrylate, a polyvinyl alcohol, an aromatic sulfonate, mutual solvents, ABA copolymers, and combinations thereof.

30. The well treatment fluid of claim 25, wherein:
the viscoelastic surfactant is selected from a zwitterionic surfactant, an amphoteric surfactant, an anionic surfactant, a cationic surfactant, and combinations thereof.

31. The well treatment fluid of claim 25, wherein:
the viscoelastic surfactant is a zwitterionic surfactant.

32. The well treatment fluid of claim 31, wherein:
the zwitterionic surfactant comprises a surfactant or mixture of surfactants having the formula:

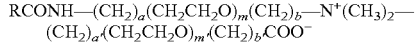

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

33. The well treatment fluid of claim 25, wherein:
the viscoelastic surfactant is a zwitterionic surfactant and wherein the shear activation additive is a base.

* * * * *